United States Patent [19]

Kawana et al.

[11] 4,390,603
[45] Jun. 28, 1983

[54] METHANOL FUEL CELL

[75] Inventors: Hidejiro Kawana; Tatsuo Horiba; Kazuo Iwamoto, all of Hitachi; Kazunori Fujita, Tohkai; Kohki Tamura, Hitachi, all of Japan

[73] Assignee: Hitachi, Ltd., Tokyo, Japan

[21] Appl. No.: 380,773

[22] Filed: May 21, 1982

[30] Foreign Application Priority Data

Jun. 30, 1981 [JP] Japan ............... 56-102596
Aug. 21, 1981 [JP] Japan ............... 56-130292

[51] Int. Cl.$^3$ .................. H01M 8/10; H01M 8/22
[52] U.S. Cl. ................................. 429/30; 429/41
[58] Field of Search ............... 429/41, 33, 42, 15, 429/30

[56] References Cited

U.S. PATENT DOCUMENTS 4,262,063 4/1981 Kudo et al. ............... 429/41

Primary Examiner—Donald L. Walton
Attorney, Agent, or Firm—Antonelli, Terry & Wands

[57] ABSTRACT

A methanol fuel cell wherein a positive electrode and a negative electrode are disposed in contact with a solid film which exhibits a hydrogen ion- and/or hydronium ion-conductivity.

The methanol permeability coefficient of the solid film of the methanol fuel cell is at most $1 \times 10^{-6}$ mol/(mol/l).min.cm$^2$.

6 Claims, 6 Drawing Figures

METHANOL FUEL CELL

BACKGROUND OF THE INVENTION

The present invention relates to a fuel cell which uses methanol as its fuel.

Methanol fuel cells in which a solid film having a hydrogen ion- and/or hydronium ion-conductivity is disposed between a positive electrode (cathode) and a negative electrode (anode), have been known before the application of the present invention.

The methanol fuel cell of this type is disclosed in, for example, U.S. Pat. No. 4,262,063 entitled "Fuel Cell Using Electrolyte-Soluble Fuels", the inventors of this patent including one of the inventors of the present application.

The prior-art methanol fuel cells, however, have not yet attained satisfactory cell performances and a high utilization efficiency of methanol.

SUMMARY OF THE INVENTION

An object of the present invention is to provide a methanol fuel cell which has good cell performances, especially a high cell voltage, and which exhibits a high utilization efficiency of methanol.

The inventors studied on a solid film having a hydrogen ion- and/or hydronium ion-conductivity (a cation-exchange resin film). As a result, they have found out that the permeability coefficient of the solid film for methanol is closely related to the cell voltage and the methanol utilization efficiency. The present invention is characterized in that the methanol permeability coefficient of the cation-exchange resin film in a methanol fuel cell according to the present invention is made at most $1 \times 10^{-6}$ mol/(mol/l).min.cm$^2$.

PREFERRED EMBODIMENTS OF THE INVENTION

Figure 1:
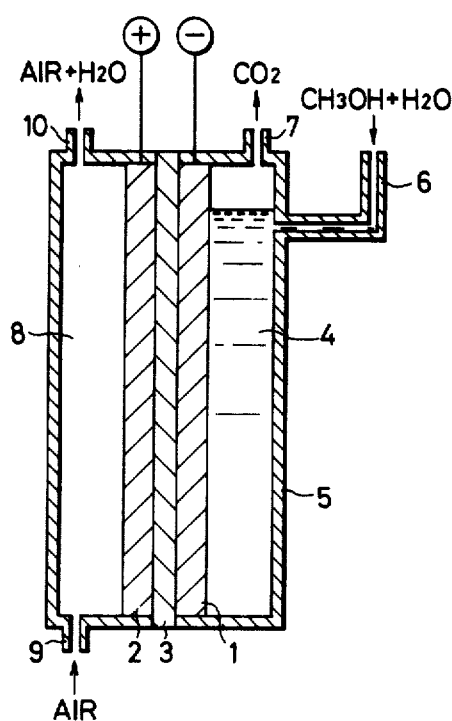
FIG. 1 is a sectional view of a methanol fuel cell showing an embodiment of the present invention.

Referring to FIG. 1, a methanol fuel cell according to the present invention is constructed of a methanol electrode (negative electrode) 1, an oxidation electrode (positive electrode) 2, a cation-exchange resin film (hydrogen ion- and/or hydronium ion-conductive solid film) 3, an electrolyte (anolyte) 4 which contains 3 mol/l of sulfuric acid and 1 mol/l of methanol, a cell case 5, a supply port 6 for the electrolyte, an exhaust port 7 for carbonic acid gas, an oxidant chamber 8 into which the air, oxygen or the like is supplied, a supply port 9 for the oxidant such as air and oxygen, and an exhaust port 10 for the oxidant or for the oxidant and water vapor.

According to the present invention, the cation-exchange resin film 3 is set at a methanol permeability coefficient of at most $1 \times 10^{-6}$ mol/(mol/l).min.cm$^2$. Thus, as will be described later, it is possible to raise the cell voltage and to sharply enhance the utilization efficiency of methanol that is, the proportion of the quantity of electricity (ampere-hour or coulomb) which can be actually derived from the methanol, with respect to the quantity of electricity which can be theoretically derived from the methanol.

These effects are similarly brought forth in a cell of the so-called laminated structure in which several unit cells are combined.

The relationship between the methanol permeability coefficient of the cation-exchange resin film and the cell voltage will be described in conjunction with the ensuing example of the present invention. Here, the quantity (Q: mol) of methanol which permeates through the cation-exchange resin film is evaluated from the following expression (1):

$$Q = P.S.C.T \tag{1}$$

where
P: permeability coefficient (mol/(mol/l).min.cm$^2$
S: film area (cm$^2$)
C: difference of concentrations (mol/l) of methanol solutions on both the sides of the film
T: elapsed time (min)

EXAMPLE 1

Cells of the construction shown in FIG. 1 were assembled by the use of sulfonic acid type cation-exchange resin films having various methanol permeability coefficients (e.g., a film of 'Nafion 425' produced by Du Pont de Nemours, which is known as one for electrodialysis, which contains a fluorocarbon resin as its main component and which has an electric resistance of approximately 0.5 Ω.cm$^2$). As each of the air electrode (positive electrode) and the methanol electrode (negative electrode), a tantalum gauze having a size of 95 mm × 140 mm was coated with 20 mg/cm$^2$ of platinum black agglomerated by employing polytetrafluoroethylene as a binder. The thickness of each electrode was 1 mm. A diaphragm (ion-exchange film) being 0.1 to 0.5 mm thick was interposed between the positive and negative electrodes, and they were held in close contact with each other into one unit cell. The methanol in the anolyte decomposed on the negative electrode 1 to produce hydrogen ions. The hydrogen ions turned into water by passing through the diaphragm (ion-exchange film) and reacting with oxygen in the air in the positive electrode 2. The water was exhausted through the exhaust port 10. When the methanol decomposed, it emitted electrons, which reached the positive electrode through an external circuit and which became electric energy.

The above cells were subjected to a discharge experiment under the following conditions:
Current density: 40 mA/cm$^2$
Temperature: 60° C.
The result of the experiment is shown in FIG. 2.

Figure 2:
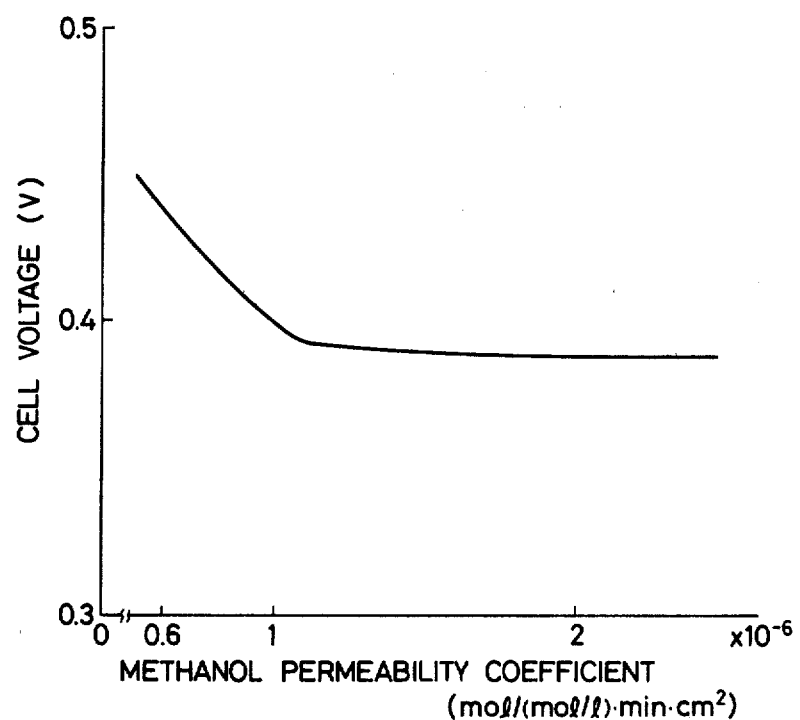
FIG. 2 is a graph illustrative of the relationship between the methanol permeability coefficient of a cation-exchange resin film and the cell voltage in the methanol fuel cell shown in FIG. 1.

As apparent from FIG. 2, the cell voltage rises abruptly and a good discharge characteristic is exhibited on the smaller-coefficient side bordered at the methanol permeability coefficient of approximately $1 \times 10^{-6}$ mol/(mol/l).min.cm$^2$. This is a quite unforeseen result.

Figure 3:
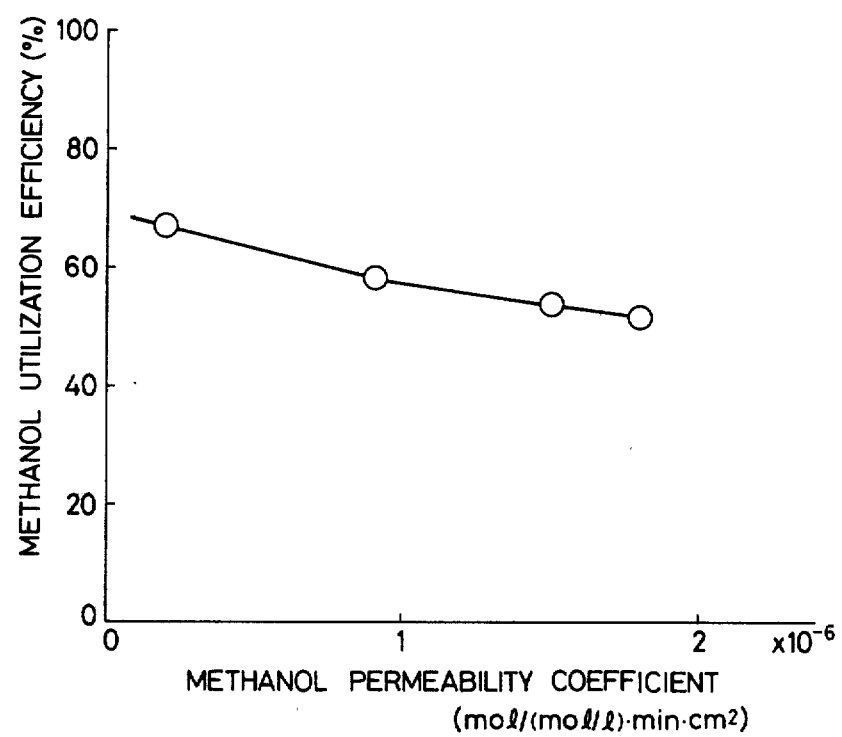
FIG. 3 is a graph illustrative of the relationship between the methanol permeability coefficient of the cation-exchange resin film and the methanol utilization efficiency in the methanol fuel cell shown in FIG. 1.

In the cell of the above example, the methanol utilization efficiency in the case of employing the cation-exchange resin film with the methanol permeability coefficient of $1 \times 10^{-6}$ mol/(mol/l).min.cm$^2$ and discharging the cell at a current density of 60 mA/cm$^2$ and a temperature of 60° C. is about 60% as shown in FIG. 3.

The inventors studied also on the electric resistance of the cation-exchange resin film. As a result, they have found out that, with an electric resistance of at most 0.7 $\Omega$.cm$^2$, the ion-exchange resin film can be prevented from changing in shape and in quality. When the film has a high electric resistance, it changes in shape or in quality due to a temperature rise thereof on account of the generation of heat. In case of employing a film with a resistance of 1 $\Omega$.cm$^2$, the rate of heat generation per cm$^2$ is 0.052 cal/min. Supposing that the specific heat of the film having a thickness of 0.1 mm and an area of 1 cm$^2$ is 0.01 cal, the temperature rise thereof per minute becomes 5° C. Since most of cation-exchange resin films change in shape and in quality at about 90° C., the temperature rise should desirably be suppressed to below 80° C. The inventors have experimentally verified that, because of heat radiation, it takes 10 minutes or more until the film temperature rises to 90° C. It has been experimentally verified that when the film resistance is at most 0.7 $\Omega$.cm$^2$, the temperature rise per minute is 3.5° C., the film temperature not rising to 80° C. or above owing to heat radiation.

The methanol permeability coefficient and electric resistance of the cation-exchange resin film of the prior-art methanol fuel cell were $2 \times 10^{-6}$ mol/(mol/l).min.cm$^2$ and 0.5–0.7 $\Omega$.cm$^2$, respectively. The cell voltage and the methanol utilization efficiency were 0.4 V and 50%, respectively.

Figure 4:
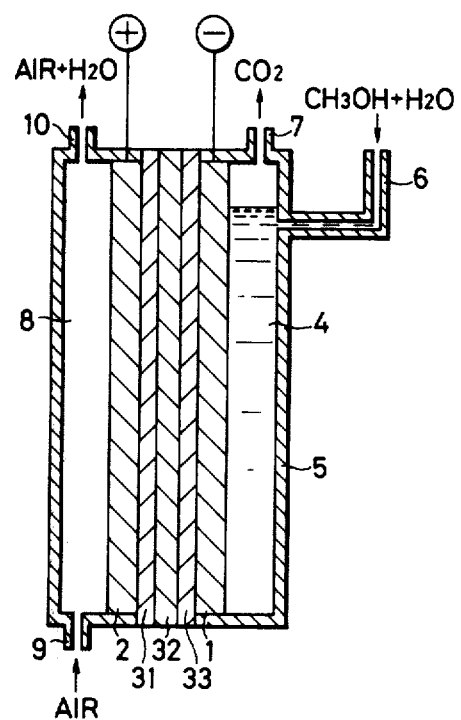
FIG. 4 is a sectional view of a methanol fuel cell showing another embodiment of the present invention.

FIG. 4 shows another embodiment of the present invention. In FIG. 4, the same numerals as in FIG. 1 indicate the same constituents as in FIG. 1. The point of difference between the cells shown in FIG. 1 and FIG. 4 is that the former has the single cation-exchange resin film 3, whereas the latter has a plurality of cation-exchange resin films 31, 32 and 33.

EXAMPLE 2

The inventors have experimentally verified that, by placing a plurality of ion-exchange films 1 one over another, the effect of suppressing the volume of methanol to permeate through the cation-exchange film, in other words, the fuel suppressing effect can be enhanced to increase the fuel utilization efficiency.

It has been experimentally verified that, as indicated by Expression (2) given below or a characteristic A in FIG. 5, the methanol permeation volume Q decreases in inverse proportion to the square of the number N of the ion-exchange films 31, 32, 33 etc.

$$Q = P \frac{S \cdot T \cdot \Delta C}{N^2} \quad (2)$$

where

Figure 5:
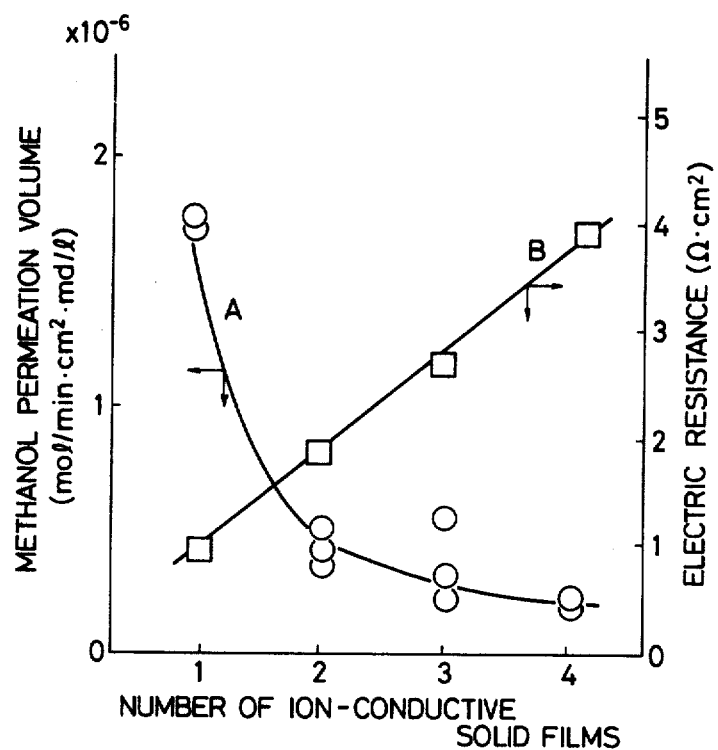
FIG. 5 is a graph illustrative of the relationship between the number of cation-exchange resin films and the methanol permeation volume of the film(s) as well as the electric resistance of the film(s), in the methanol fuel cell shown in FIG. 4.

Q: volume of the liquid fuel to permeate through the ion-exchange films
P: permeability coefficient
S: area of the ion-exchange films
T: elapsed time
$\Delta C$: fuel concentration difference between both the sides of the ion-exchange films
N: number of the ion-exchange films placed one over another On the other hand, the electric resistance increases in proportion to the number of the ion-exchange films as indicated by a characteristic B in FIG. 5.

Figure 6:
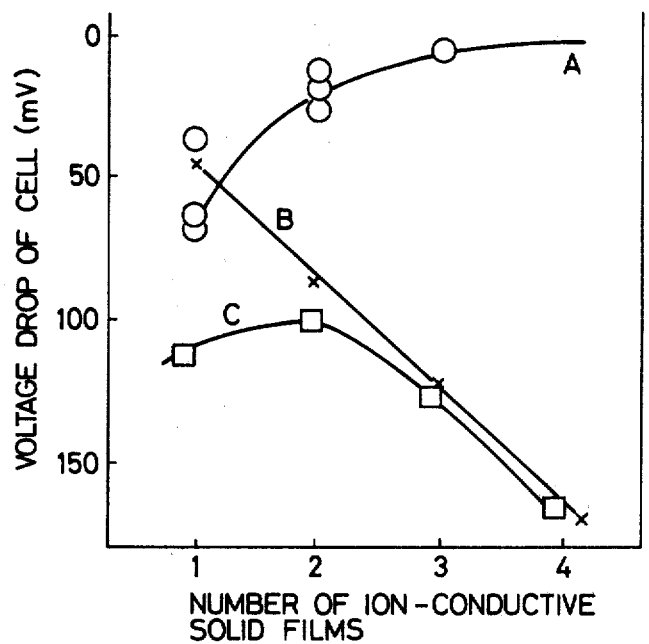
FIG. 6 is a graph illustrative of the relationship between the number of the cation-exchange resin films and the voltage drop of the cell in the methanol fuel cell shown in FIG. 4.

When the methanol reaches the cathode (air electrode) 2, it reacts with oxygen, and hence, the potential of the air electrode 2 lowers. The relationship between the number of the ion-exchange films and the cell voltage is illustrated as a characteristic A in FIG. 6.

When the number of the ion-exchange films is increased, the drop of cell voltage decreases. This is because the cation-exchange films 31, 32 and 33 prevent the methanol from reaching the cathode 2.

As another cause for the drop of the cell voltage, there is considered the resistance of the ion-exchange films 31, 32 and 33 themselves. The relationship between the number of the ion-exchange films and the drop of the cell voltage ascribable to the film resistance is illustrated as a characteristic B in FIG. 6.

The main causes for the drop of the cell voltage are the two causes mentioned above. The combined drop value of the cell voltage ascribable to the two becomes as indicated by a characteristic C in FIG. 6.

It has been experimentally verified that, in case of placing more than two films of 'Nafion 425' (produced by DuPont de Nemours) one over the other as the cation-exchange films, the drop of the cell voltage becomes the least. In this case, a value of 0.2–0.5 mm is the optimum as the thickness of the whole lamination of the cation-exchange films 31, 32, and 33.

In case of placing the cation-exchange films 31, 32, and 33 one over the other, an air bubble needs to be prevented from entering the position between these cation-exchange films. The reason is that when the air bubble is involved, the resistance of the whole lamination increases, resulting in a cell voltage drop. In order to prevent the air bubble from being involved, it is more preferable that the cation-exchange films 31, 32, and 33 are placed one over other or one over another in an acid or neutral solution, favorably a methanol solution, whereupon the resulting lamination is brought into close contact with the electrodes 1 and 2.

What is claimed is:

1. A methanol fuel cell comprising:
   a positive electrode which has two major surfaces, the first major surface lying in direct contact with an oxygen-containing gas;
   a hydrogen ion- and/or hydronium ion-conductive solid film which has two major surfaces, the first major surface lying in close contact with the second major surface of said positive electrode, and which has a methanol permeability coefficient of at most $1 \times 10^{-6}$ mol/(mol/l).min.cm$^2$;
   a negative electrode which has two major surfaces, the first major surface lying in close contact with the second major surface of said solid film; and
   methanol fuel which lies in direct contact with the second major surface of said negative electrode.

2. A methanol fuel cell according to claim 1, wherein said solid film has an electric resistance of at most 0.7 Ω.cm².

3. A methanol fuel cell according to claim 1, wherein said solid film has a thickness of 0.1 to 0.5 mm.

4. A methanol fuel cell according to claim 3, wherein said solid film is constructed of a plurality of ion-exchange films which are placed in close contact and in parallel with said major surfaces.

5. 15. A methanol fuel cell according to claim 4, wherein said films are placed in close contact within an acid or neutral solution.

6. A methanol fuel cell according to claim 4, wherein said films are placed in close contact within a solution containing methanol.

* * * * *